J. H. HOBBS.
Manufacture of Glass-Ware.
No. 169,103. Patented Oct. 26, 1875.
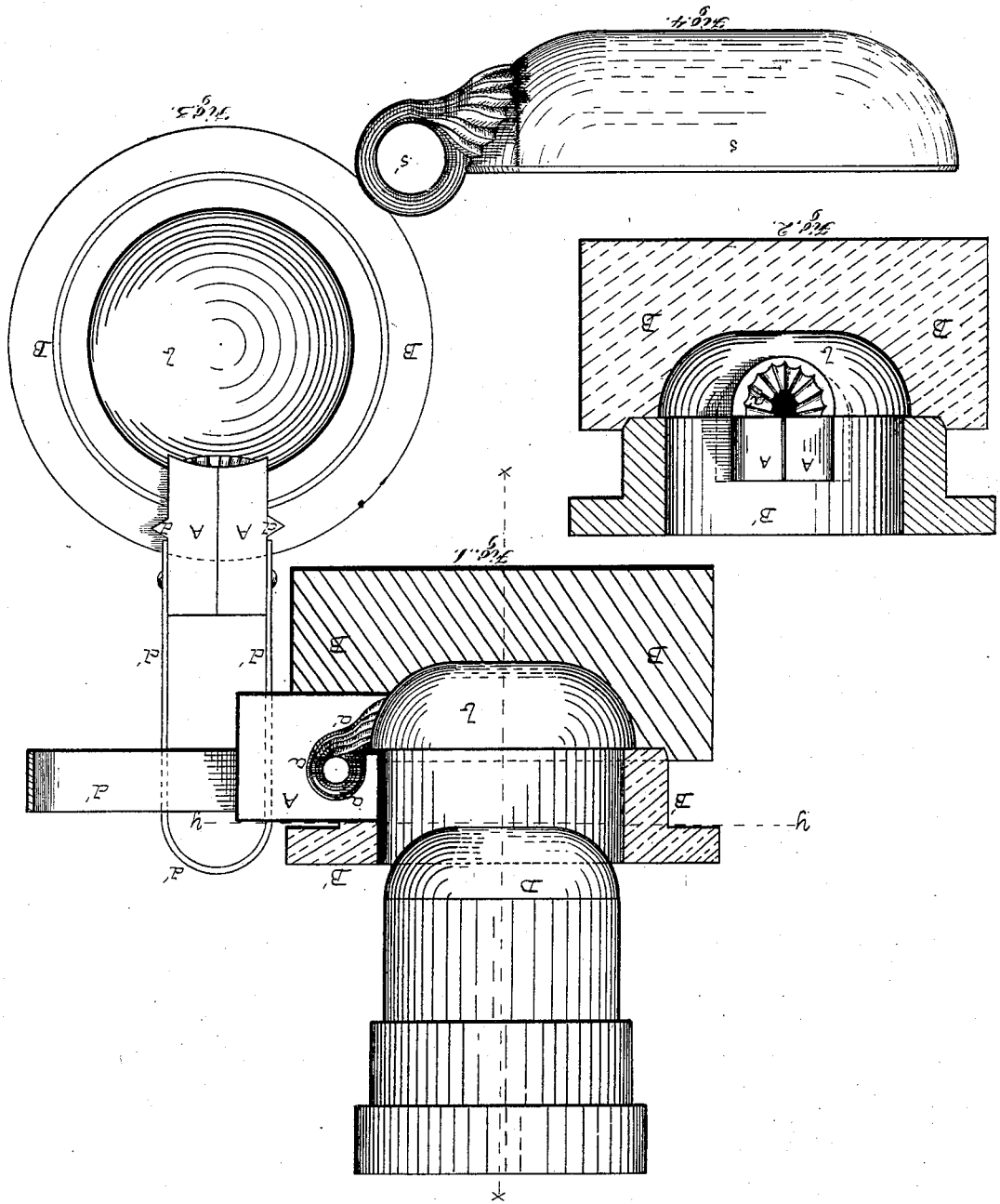

UNITED STATES PATENT OFFICE.

JOHN H. HOBBS, OF WHEELING, WEST VIRGINIA.

IMPROVEMENT IN THE MANUFACTURE OF GLASSWARE.

Specification forming part of Letters Patent No. 169,103, dated October 26, 1875; application filed September 25, 1875.

*To all whom it may concern:*

Be it known that I, JOHN H. HOBBS, of Wheeling, county of Ohio, State of West Virginia, have invented or discovered a new and useful Improvement in Manufacture of Glassware; and I do hereby declare the following to be a full, clear, concise, and exact description thereof, reference being had to the accompanying drawing, making a part of this specification, in which like letters indicate like parts.

Figure 1 is a vertical sectional view of the mold through the handle-cavity, and between the two jaws which form the handle-cavity. Fig. 2 is a vertical sectional view through $xx$, Fig. 1. Fig. 3 is a top or plan view of the bottom part of the mold, showing the bowl-cavity, and also of the jaws in place for forming the handle-cavity; and Fig. 4 is an enlarged side elevation of the product of the molds.

Heretofore, in the manufacture of bowled articles of glassware with handles, the bowl and handle have commonly been pressed at one operation in a jointed or two-part mold, or the bowl has been pressed first in an unjointed or solid mold, and the handle afterward shaped and stuck on. In the former operation a fin or joint-mark is left on the bowl, and in the latter case a considerable additional expense is incurred in the putting on of the handle, and the same article, after being thus manufactured, is not as strong as the handled article that is made complete, handle and bowl at one pressure, of one piece of glass.

By my improvement I press the bowl part in an unjointed or solid mold, so as to avoid fins or joint-marks on its plain finished surface, and by a secondary two-part mold, above spoken of as jaws, introduced at the side of the main or bowl mold, with the cavities of the two in communication, I make a pressed handle at the same time I make the bowl, and in the same operation.

In the drawing, B represents the bottom or bowl part of the mold, made with a bowl-cavity, $b$, of any desired form, according to the article to be made. The usual plunger-ring is shown at B', and D is the plunger, its pressing end being of the proper form to make and shape the inside of the bowl desired. In one side of the bowl part B I make a recess suitable for the insertion therein of a two-part handle-mold, A A, when the two are brought together face to face. The sides of the recess are grooved vertically, and the outer faces of the jaws A A (which constitute the handle-mold) are ribbed, as at $d$, so that the jaws shall be properly guided and held in place. These jaws may be hinged together like an ordinary open-and-shut mold, or may be used without any connection of one to another; but for convenience in use I prefer to connect them together by a metallic spring-bow, $d'$. In the inner face of each, as shown in Fig. 1, I make the one-half of a handle-cavity, $a$, of a ring or other desired form, and connect it by a like cavity, $a'$, with the bowl-cavity $b$. These handle-cavities are preferably made with ribs or flutings or other irregularities, such as will conceal, partially or wholly, the fin or joint-mark formed along the joint of the jaws A, and like means may be employed, if so desired, to conceal the fins formed along the joints of the jaws A with the mold B. The plunger-ring B' is recessed, so as to pass down over the jaws A, and so much of the inner ends of the jaws as comes above the pressing-cavity when the plunger is down is dressed to the curvature of the inner periphery of the ring B', and is flush therewith. So much of the inner ends of the jaws A as comes opposite to the bowl-cavity $b$ constitutes a part of the exterior walls of such cavity.

In operation the workman places the jaws A in position, as also the plunger-ring, drops the proper quantity of hot molten glass into the bowl-cavity $b$, brings down the plunger D, whereby a dish, such as is shown in Fig. 4, is produced at a single operation, the hot glass being forced out into the cavities $a' a$, so as to form the handle $s'$ at the same time with the bowl $s$. As soon as the glass is sufficiently set, the plunger is raised, the ring removed, and the jaws A A lifted out, raising that side of the dish $s$ with them; or, by inversion of the bowl part B, both are discharged together. The jaws A A are opened, or fly apart, by the action of the spring-bow $d'$, and then the dish is ready for the usual or any desired work of finishing or annealing. In this way I produce a bowl and handle at one operation, the bowl being free from the usual objectionable fins or mold-marks up and down its plain exterior surface.

This mode of manufacture may also be applied to the making of other bowled articles and handles of different shapes, and in these respects I do not limit myself to the forms shown. The means of fastening the jaws A A in the bowl-mold may also be varied at pleasure, without any substantial departure from my invention.

I claim herein as my invention—

1. The combination of an unjointed or solid bowl-mold and a jointed handle-mold, substantially as described, whereby a pressed handle and a pressed bowl free from the usual fins or mold-marks shall be produced at one operation.

2. A two-part or jointed mold united by a metallic spring-bow, substantially as set forth.

In testimony whereof I have hereunto set my hand.

JOHN H. HOBBS.

Witnesses:
JAY E. RATCLIFFE,
B. M. HILDRETH.